July 29, 1969    S. M. SHOBERT    3,458,374
METHOD OF MAKING A BRAIDED TUBULAR BEARING HAVING A
POLYTETRAFLUOROETHYLENE LINER
Filed Dec. 15, 1965

INVENTOR.
Samuel M. Shobert
BY Hood Gust & Irish
Attorneys

United States Patent Office 3,458,374
Patented July 29, 1969

3,458,374
METHOD OF MAKING A BRAIDED TUBULAR
BEARING HAVING A POLYTETRAFLUORO-
ETHYLENE LINER
Samuel M. Shobert, 17760 Dragoon Trail,
Mishawaka, Ind. 46544
Filed Dec. 15, 1965, Ser. No. 513,982
Int. Cl. B32b 27/38, 17/10; B65h 81/00
U.S. Cl. 156—149                    5 Claims

ABSTRACT OF THE DISCLOSURE

The method of fabricating a tubular bearing comprising the steps of (a) providing a tubular lining of solid cross-sectional wall thickness of polytetrafluoroethylene material having an etched outer surface bondable to a resinous material, (b) wrapping a layer of reinforcing glass fiber over the lining, (c) and impregnating the layer with a resinous material to an extent that the latter penetrates to the outer peripheral surface of said lining and also forms a mass in which said layer is embedded, the resinous material being of the class which bonds said lining to the layer.

---

The present invention relates to a plastic bearing, and more particularly to a shaft bearing that does not require oil or the like for lubrication and, further, can be operated at high rotational speeds.

Plastic bearings, commonly referred to as "static bearings," because they are used at relatively low speeds such as one to two revolutions per minute, have heretofore been known and are disclosed and claimed in Patent No. 3,131,979. The structure of this prior patent made it possible to overcome certain of the problems involved in using a plastic material, commonly referred to as polytetrafluoroethylene. One of the problems solved was that of dimensional instability due to the cold flow properties of the plastic. It was found that by incorporating polytetrafluoroethylene fibers with cotton fibers and forming the same into a thread, the polytetrafluoroethylene in sufficient quantity could be held in situ in a bearing structure. Such a structure was found to have excellent properties when used as a static bearing at low rotational speeds; however, for high speeds it was found to be less satisfactory.

The present invention overcomes the deficiencies of the prior art structures and provides a polytetrafluoroethylene bearing surface in a bearing structure, said surface having excellent lubricity and wear-life.

It is therefore an object of this invention to provide a bearing and a method for fabricating the same wherein high speed operation can be achieved while satisfying the requirements of wear-life, lubricity, dimensional stability, economy and compression strength.

It is another object of this invention to provide a bearing structure which has as one of its elements a film of polytetrafluoroethylene which is bonded securely to an annular backing of plastic or resinous material reinforced with glass fibers.

The above-mentioned and other features and objects of this invention and the manner of attaining them will become more apparent and the invention itself will be best understood by reference to the following description of an embodiment of the invention taken in conjunction with the accompanying drawings, wherein.

Figure 4:
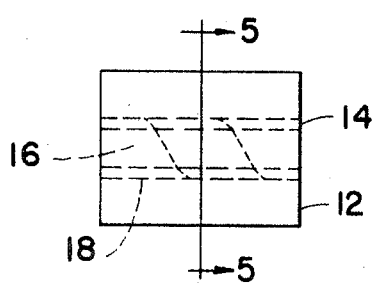
FIG. 4 is a side view of a finished bearing of this invention.
Figure 5:
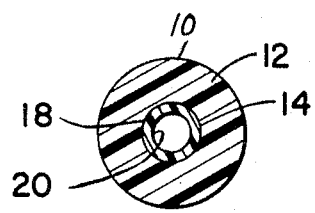
FIG. 5 is a cross-section taken substantially along section line 5—5 of FIG. 4.

Referring to the drawings, the bearing of this invention is fabricated of essentially three different components, a polytetrafluoroethylene liner, a plastic backing material, and reinforcing fibers embedded in the plastic backing. As shown in FIGS. 4 and 5, the cylindrical bearing indicated generally by reference numeral 10 is composed of essentially two laminations 12 and 14 which are tubular in shape and coaxial. These laminations are contiguous and tightly bonded together into a unitary, compact structure.

Figure 1:
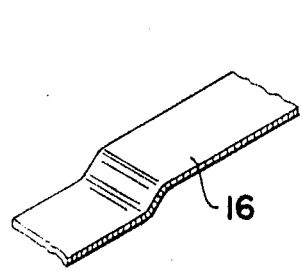
FIG. 1 is a perspective illustration of a short length of polytetrafluoroethylene tape material used in the bearings of this invention.

The tubular lamination 14 is film-like in wall thickness and is composed of a thin tape like that shown in FIG. 1. This particular tape is of a polytetrafluoroethylene plastic in thicknesses of from .001 inch to .010 inch. The polytetrafluoroethylene material from which the tape is made may be of various formulations so long as the lubricity properties of the plastic are maintained. Suitable polytetrafluoroethylene tapes and tape materials are disclosed in the booklet copyrighted in 1964 by the Dixon Corporation, this booklet being entitled "Rulon and Teflon."

The tape of FIG. 1, indicated by numeral 16, is formed into the shape of the tubular element or lining 14 and is held in this form by the layer 12 which comprises helically braided glass threads coaxially surrounding the lining 14 and embedded in a suitable, hardened resinous material. In the preferred embodiment of this invention, this resinous material is an epoxy resin of the type conventionally used in the fabrication of glass-reinforced plastic fishing poles, the epoxy adhesively bonding or securing the lining 14 in place. In order to assure bonding of the tape composing the lining 14, one surface of the tape is etched as disclosed in the above-identified publication. Such etching is conventionally accomplished by the use of sodium amalgamate solutions, ammonia and the like, the etching treatment being limited to only one surface of the tape so as to leave the opposite surface free of etching and available for use as the lubricous bearing surface.

As shown in FIGS. 4 and 5, the etched surface is indicated by the numeral 18 as being bonded directly to the lamination 12, thereby leaving the inner surface 20 as the low friction surface.

The glass threads used in the lamination 12 preferably are of the glass yarn type, each thread being composed of a multiplicity of tiny, elongated fibers which, in effect, when bundled together, form the final continuous length of thread. Also, this thread may consist of a plurality of glass strands or threads or still further be in the form of roving without departing from the scope of this invention.

Figures 2, 3:
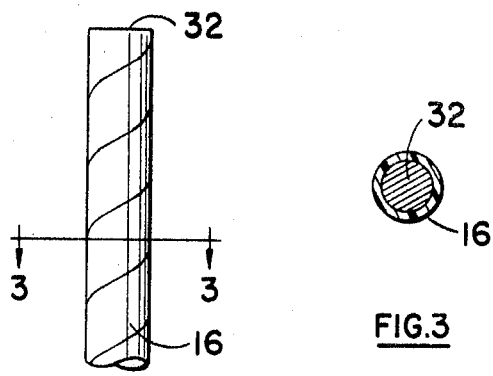
FIG. 2 is a fragmentary view of a mandrel having the tape of FIG. 1 wrapped thereon for illustrating one of the steps in the method of producing the bearing of this invention.
FIG. 3 is a cross-section taken substantially along section line 3—3 of FIG. 2.
Figure 6:
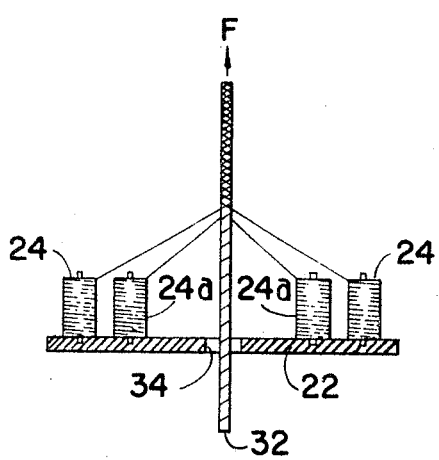
FIG. 6 is a diagrammatic illustration, partly in vertical section, of an apparatus used in the fabrication of this bearing.
Figure 7:
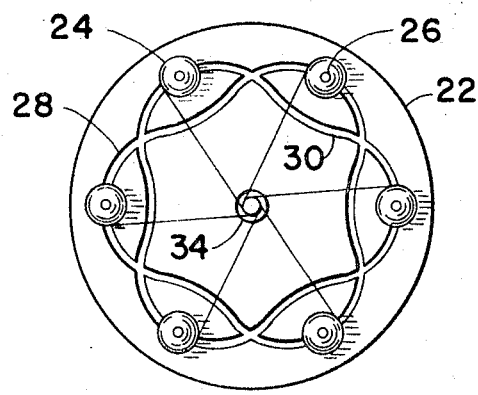
FIG. 7 is a top plan view in diagrammatic form of the arrangement of FIG. 6.

The method of fabricating the bearing will now be described. Referring to FIGS. 2, 6 and 7, a conventional braiding machine carries on its supporting table 22 a suitable number of spools 24 of thread. The spools 24 are supported on suitable spindles 26 which fit into guide grooves 28 in the table 22. These grooves 28 follow an undulating pattern as illustrated in FIG. 7. There are two series of spools on the table 22, the spools 24 (referring to FIG. 6) being considered as the outer spools and the spools 24a being considered as the inner spools. The reason for this characterization is to demonstrate more clearly by reference to both FIGS. 6 and 7 that there are two different undulating grooves 28 and 30 which cross over symmetrically as illustrated, the spools 24 and 24a, respectively, riding these grooves.

A mandrel 32 of polished steel or the like, cylindrically shaped, is passed through a clearance opening 34 in the table 22 as shown. An operator can hold this mandrel 32 in position and operate it in the proper manner, as will be explained later on.

Prior to inserting the mandrel 32 into the machine of FIGS. 6 and 7, the polytetrafluoroethylene tape 16 of FIG. 1 is first helically wrapped onto the mandrel in edge-to-edge relation as shown in FIG. 2. The mandrel preferably is wrapped from end-to-end as shown more clearly in FIG. 6. The wrapped mandrel is then inserted through the opening 34 in the table 22 as shown in FIG. 6 and the threads from the respective spools 24 and 24a are individually affixed to the upper end of the mandrel 32 by some suitable means such as tying, whereupon the apparatus is ready for operation.

In operation, the mandrel 32 with the wrapping of tape 16 thereon is slowly raised in the direction of the arrow F, while the spools 24 and 24a are moved at a uniform rate of speed through the guiding grooves 28 and 30, respectively, in opposite directions. Considering for a moment the motion of one spool 24, it will form an interleaving braid with the threads from the spool 24a. The mandrel 32 is continuously raised at a uniform rate until the braiding operation is completed for the entire length thereof. The individual threads are then cut, thereby leaving the mandrel 32 with a wrapping of tape 16 thereon and a covering of braided glass thread.

Desirably, and for one embodiment of this invention, a second braid of glass thread is applied over the first layer in the same manner as just described. Additional braided layers may be applied if desired.

Figure 8:
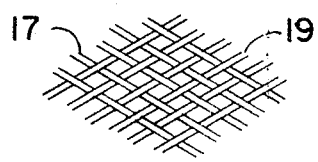
FIG. 8 is an enlarged view of a small area of the interleaved threads in the bearing as woven by the apparatus of FIGS. 6 and 7.

The pattern of the braid is graphically illustrated in FIG. 8 and is shown as comprising a plurality of threads 17 and 19 which are criss-crossed in woven relationship, each of the threads 17 and 19 alternately passing over and under each other as shown. Each thread 17, 19 follows the form of a helix from one end of the bearing 10 to the other as well as from one end of the mandrel 32 to the other when the braiding operation thereon has been completed.

The mandrel with its composite covering is next immersed, or wetted by some suitable means, in a bath of liquid resin material. Making certain that all of the threads are thoroughly impregnated with this resin material, and that such resin material has penetrated to wet thoroughly the etched surface of the tape 16 which is outermost on the mandrel 32, the mandrel with this impregnated covering is placed in a curing mold or oven. Heat is thereby applied to the resin material until it is completely cured and hardened. The mandrel 32 is then removed from the lining, the resultant product being a hollow, self-supporting tube composed of an inner lining of the tape 16 and several layers of glass braid on the outside thereof.

It is important at this point to note that the surface of the tape 16 which is etched is outermost when the tape is wrapped on the mandrel 32. The tape is tightly wound onto the mandrel as well as being snugly abutted edge-to-edge such that when the mandrel with its braided layers of thread is immersed into a bath of liquid resin, none of this resin will penetrate to the inner surface of the tape 16 next to the mandrel 32. Thus, the hollow tube which is stripped off of the mandrel 32 after the hardening process has no resin on the inner surface of the lining 14.

This finished tube may have its outer surface ground smooth to a true cylindrical shape coaxial with the inner peripheral surface of the liner 14. This elongated tube after being so ground is then cut into short lengths of predetermined dimension as may be needed for any particular application to which the bearing is to be put.

The thickness of the tape 16, or in other words the radial dimension of the lining 14, is film-like. The term "film-like" is used to denote a thickness in the tape 16 and lining 14 which satisfies the operational requirements of this bearing. As explained previously, this bearing is intended to be used at relatively high speeds of a shaft journaled therein, such that in order to satisfy the requirements of such a bearing, it must exhibit the properties of low friction and high wear-resistance. As is well known, polytetrafluoroethylene material is dimensionally unstable because of its tendency to flow or deform while subjected to a load. If the lining 14 is too thick, radial shaft loads will cause the lining to change shape and thereby destroy the necessary bearing properties. By keeping the lining 14 quite thin, it has been discovered that the effects of cold flow are substantially eliminated and dimensional stability is achieved. The lamination or shell 12 is dimensionally stable and unyielding under load, such that the dining 14 is thereby retained firmly in place. The term "film-like" is intended to define the particular thickness of the lining 14 at which this dimensional stability can be achieved. Experiments have proven that linings of from .001 inch to .010 inch provide excellent results in maintaining dimensional stability, lubricity and wear qualities.

The resinous material in the layer 12 not only serves as a part of the shell for the lining 14, but also as the bonding agent. In serving this dual function, the lining 14 is thereby easily secured into position for the life of the bearing. One problem encountered in the prior art in connection with forming satisfactory bearings from polytetrafluoroethylene materials has been the one of securing in an economical and simple manner the polytetrafluoroethylene material in place. The present invention is the ultimate in simplicity and economy in the fabrication of the bearing. While epoxy resin is preferred, polyester resins, in some instances, may be employed.

The polytetrafluoroethylene tape used in this invention may be of the filled or unfilled type; however, the filled material is preferred. The fillers used are those which contribute to the compressive strength and wear resistance of the polytetrafluoroethylene material. Suitable material is conventionally available on the open market and is disclosed and advertised in the booklet mentioned hereinbefore.

What is claimed is:

1. The method of fabricating a tubular bearing comprising the steps of (a) providing a tubular lining of solid cross-sectional wall thickness of polytetrafluoroethylene material; having an outer surface bondable to a resinous material; (b) wrapping a layer of reinforcing thread over said lining, (c) and impregnating said layer with a resin material to an extent that the latter penetrates to the outer peripheral surface of said lining and also forms a mass in which said layer is embedded, said resin material being of the class which bonds said lining to said layer.

2. The method of claim 5 wherein said reinforcing thread is glass and is braided to form said layer and said resin material is epoxy, and forming the lining with an etched outer surface.

3. The method of claim 2 including (d) curing said epoxy, (e) removing said mandrel from said wrapping thereby leaving an elongated tubular member of coaxial layers of polytetrafluoroethylene and braid, and (f) cutting said tubular member into tubular pieces of predetermined length.

4. The method of claim 3 including (g) applying plural layers of braid over said wrapping prior to impregnation thereby providing a glass-resin annular shell as an unyieldable backing for said wrapping.

5. The method of claim 1 wherein said step of providing a tubular lining comprises the step of helically wrapping onto a cylindrical mandrel a film-like type of polytetrafluoroethylene material in abutting edge-to-edge relation, said tape having an etched surface and being wrapped onto said mandrel with said etched surface outermost.

References Cited

UNITED STATES PATENTS

| | | | |
|---|---|---|---|
| 3,131,979 | 5/1964 | Shobert | 308—238 |
| 928,285 | 7/1909 | Speer | 156—149 XR |
| 3,056,709 | 10/1962 | Rising et al. | 308—238 XR |
| 3,110,530 | 11/1963 | Herman | 308—238 |

PHILIP DIER, Primary Examiner

U.S. Cl. X.R.

156—172, 195; 161—189; 308—238